(12) United States Patent
Berland (10) Patent No.: US 7,684,283 B2
(45) Date of Patent: Mar. 23, 2010

(54) CABLE DEVICE

(75) Inventor: Norvald Berland, Fyllingsdalen (NO)

(73) Assignee: Benney AS, Bergen (NO)

( * ) Notice: Subject to any disclaimer, the term of this patent is extended or adjusted under 35 U.S.C. 154(b) by 279 days.

(21) Appl. No.: 11/927,735

(22) Filed: Oct. 30, 2007

(65) Prior Publication Data

US 2009/0107720 A1 Apr. 30, 2009

(51) Int. Cl.
*G01V 1/38* (2006.01)
(52) U.S. Cl. .......................... 367/154; 367/20
(58) Field of Classification Search ................ 367/20, 367/153, 154; 174/101.5
See application file for complete search history.

(56) References Cited

U.S. PATENT DOCUMENTS

| 4,636,998 A | * | 1/1987 | Greene et al. ............ 367/154 |
| 4,641,288 A | | 2/1987 | McGowan |
| 5,365,491 A | | 11/1994 | Sullivan |
| 5,673,235 A | | 9/1997 | Miller |
| 5,844,860 A | | 12/1998 | Miller |
| 6,278,823 B1 | | 8/2001 | Goldner |

FOREIGN PATENT DOCUMENTS

EP 0113623 7/1984

OTHER PUBLICATIONS

ISR + WO in corresponding PCT application.

* cited by examiner

*Primary Examiner*—Ian J Lobo
(74) *Attorney, Agent, or Firm*—Christian D. Abel (57) ABSTRACT

A cable device wherein a signal-carrying cable is disposed within a flexible towing sleeve. The towing sleeve is made of a flexible, elongated sheet of abrasion-resistant material, into which is arranged a plurality of longitudinal, parallel pockets or sleeves. One or more elongated strain elements are arranged in the pockets such that one or more loops protrude at each end of the elongated sheet. The sheet is formed into a cylinder, in the interior of which is arranged the signal-carrying cable. A plurality of such cables may be connected in series to signal processing modules for use as seismic cables.

12 Claims, 10 Drawing Sheets

CABLE DEVICE

FIELD OF THE INVENTION

The invention relates to cables, and according to one aspect of the invention to towable seismic cables.

BACKGROUND OF THE INVENTION

In a variety of applications, an electrical cable or a plurality of co-joined cable sections must be towed or otherwise subjected to a pulling force. In such situations, it is desirable that the pulling force not be transmitted to the electrical wires or connection points. One such application is underwater seismic cables. In order to accommodate the pulling forces, which can be quite great, such cables are traditionally sheathed in a reinforced insulation layer in which high tensile strength wires or the like are integrated into the insulation. This reinforcement layer takes up the pulling forces, thus protecting the electrical wires from damage. The reinforcement layer also protects the electrical wires from damage due to abrasion against the seafloor while the cable is towed/deployed. For co-joined cable sections, the reinforced layer of one section is connected to the reinforced layer of an adjacent section in order to prevent the pulling forces from being transferred to the connection point. Such cables are expensive, however, and suffer from numerous disadvantages known to one skilled in the art. There is a need therefore for an improved towing arrangement for cables.

DETAILED DESCRIPTION OF THE INVENTION

Figure 1:
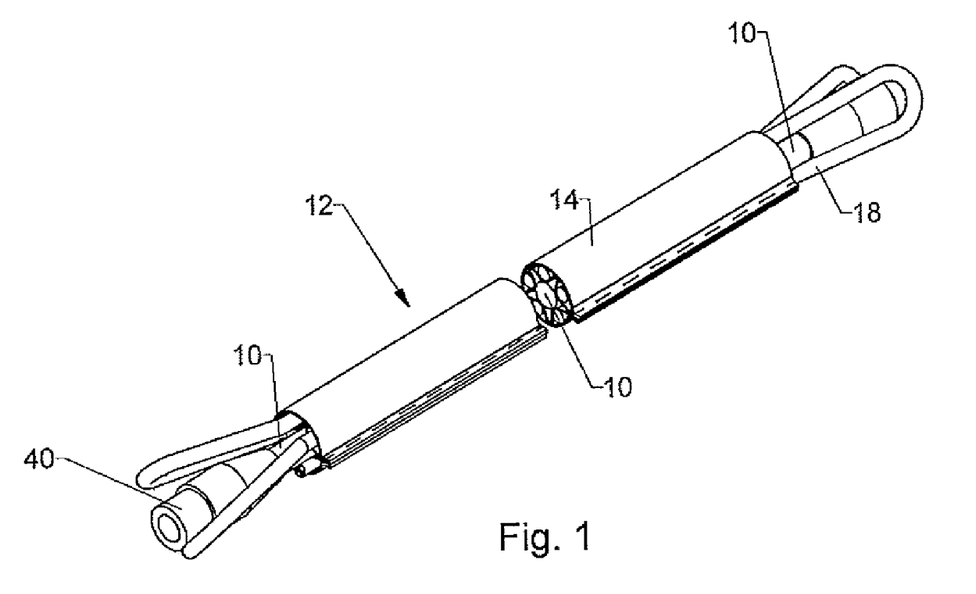
FIG. 1 is a perspective view of a seismic cable section according to one aspect of the invention.
Figure 2:
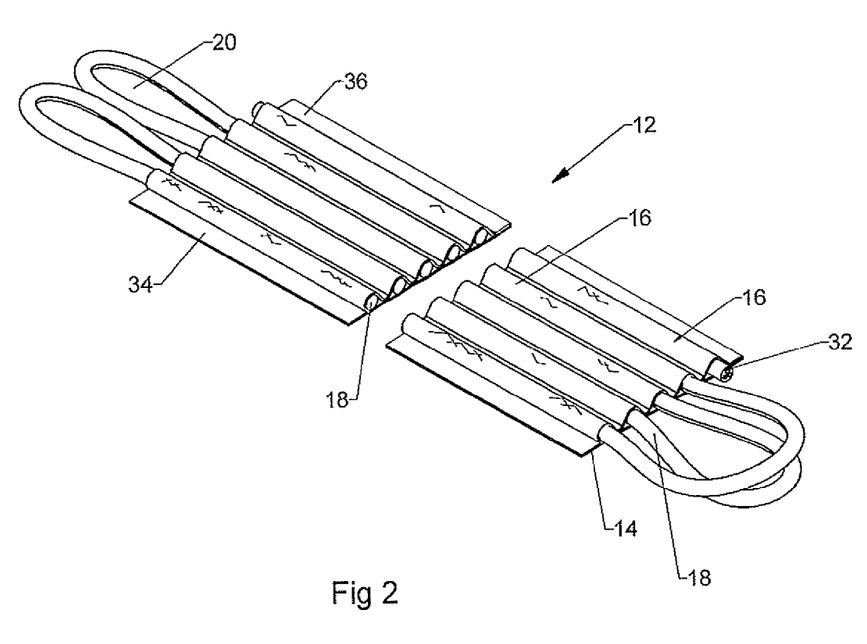
FIG. 2 is a perspective view of a towing sleeve according to one aspect of the invention.

A shown in FIG. 1, the cable according to one aspect of the invention comprises a signal-carrying cable 10 disposed within a flexible towing sleeve 12. As shown in FIG. 2, the towing sleeve comprises a flexible, elongated sheet of abrasion-resistant material 14, into which is arranged a plurality of longitudinal, parallel pockets or sleeves 16. Pockets 16 may be formed by sandwiching a second layer of flexible material on top of elongated sheet 14, said second layer having a greater width than sheet 14, and sewing longitudinal seams to form the pockets.

Figure 5:
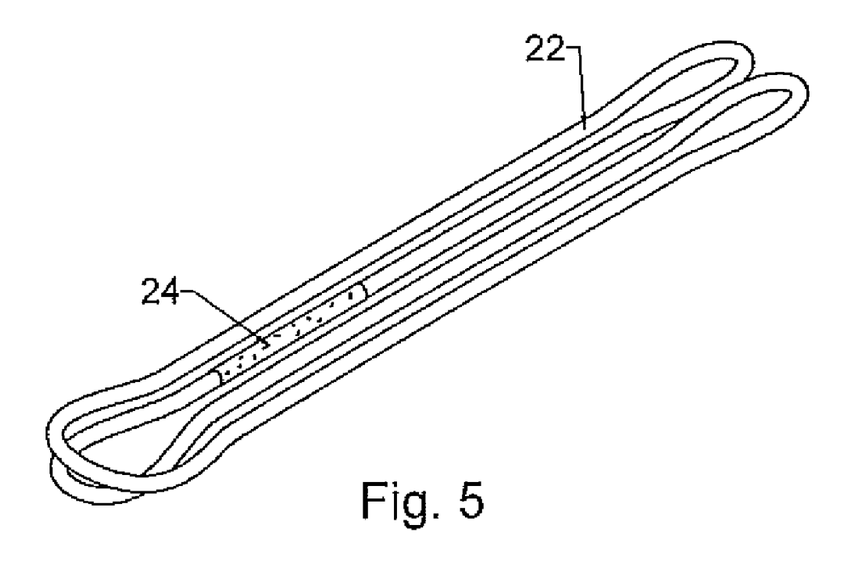
FIG. 5 is a perspective view of a first embodiment of a strain element
Figure 6:
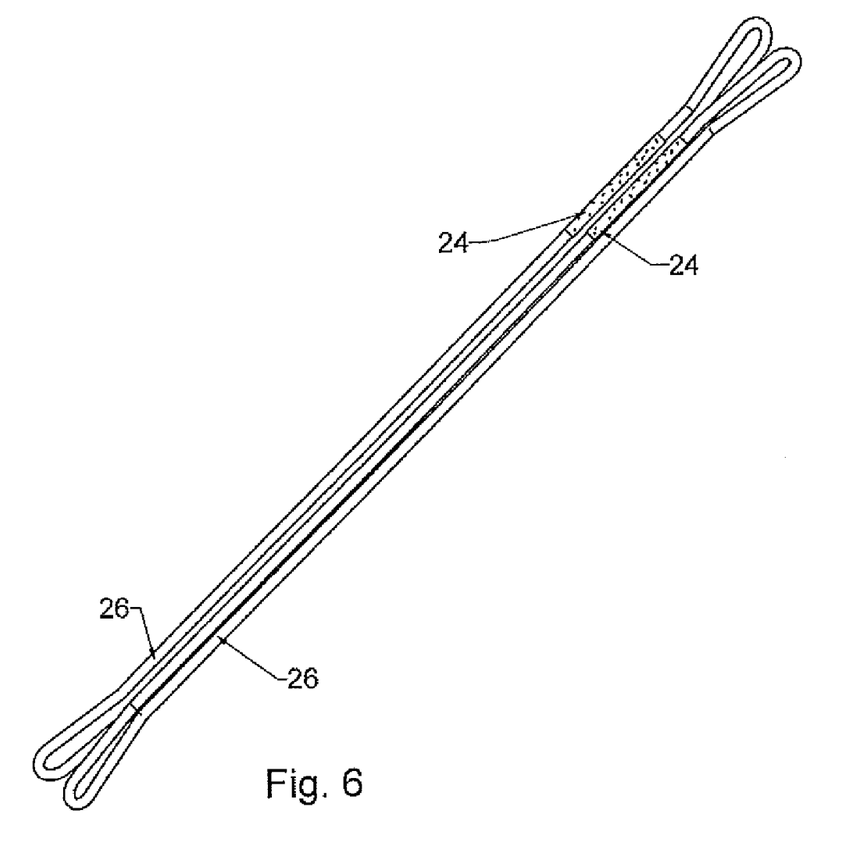
FIG. 6 is a view of an alternate embodiment of a strain element
Figure 7:
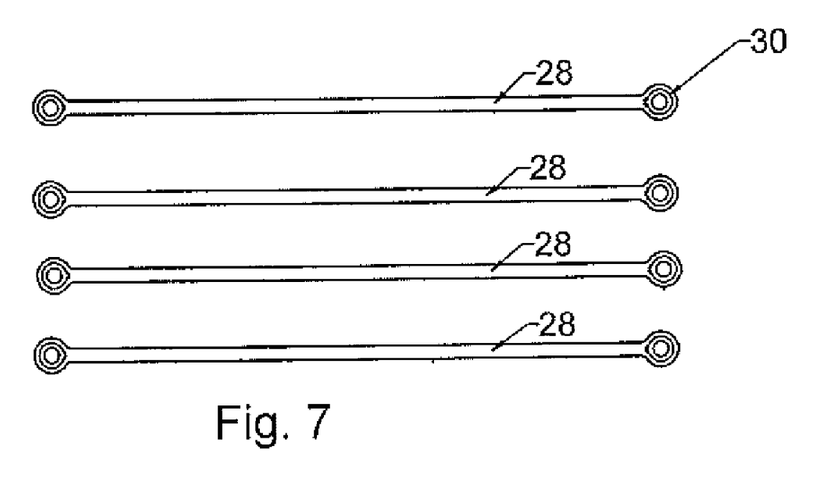
FIG. 7 is a view of an alternate embodiment of strain elements

One or more elongated strain elements 18 are arranged in pockets 16 such that one or more loops 20 protrude at each end of the elongated sheet. According to one aspect of the invention the strain element is a single rope 22, the ends of which are joined together by a splice 24 into a continuous loop. Rope 22 is doubled back upon itself as shown in FIG. 5, such that two loops are formed at each end of the elongated sheet 14, as shown in FIG. 2. According to another aspect of the invention, two ropes 26, the ends of which are joined together by respective splices 24 are employed, as shown in FIG. 6. According to yet another aspect of the invention, a plurality of individual rope segments 28 having loops 30 at each end as shown in FIG. 7 may be arranged in pockets 16 of the elongated sheet 14. It should be appreciated that the strain elements may be wires for example.

According to yet another aspect of the invention, a utility cord 32 may be arranged in a pocket 16 as shown in FIG. 2 for various purposes such as to affect the buoyancy of the cable. A lead cord would for example help the arrangement sink to the sea floor, whereas a buoyant rope or cord could be arranged in a pocket 16 to cause the arrangement to float on the surface.

Figure 3:
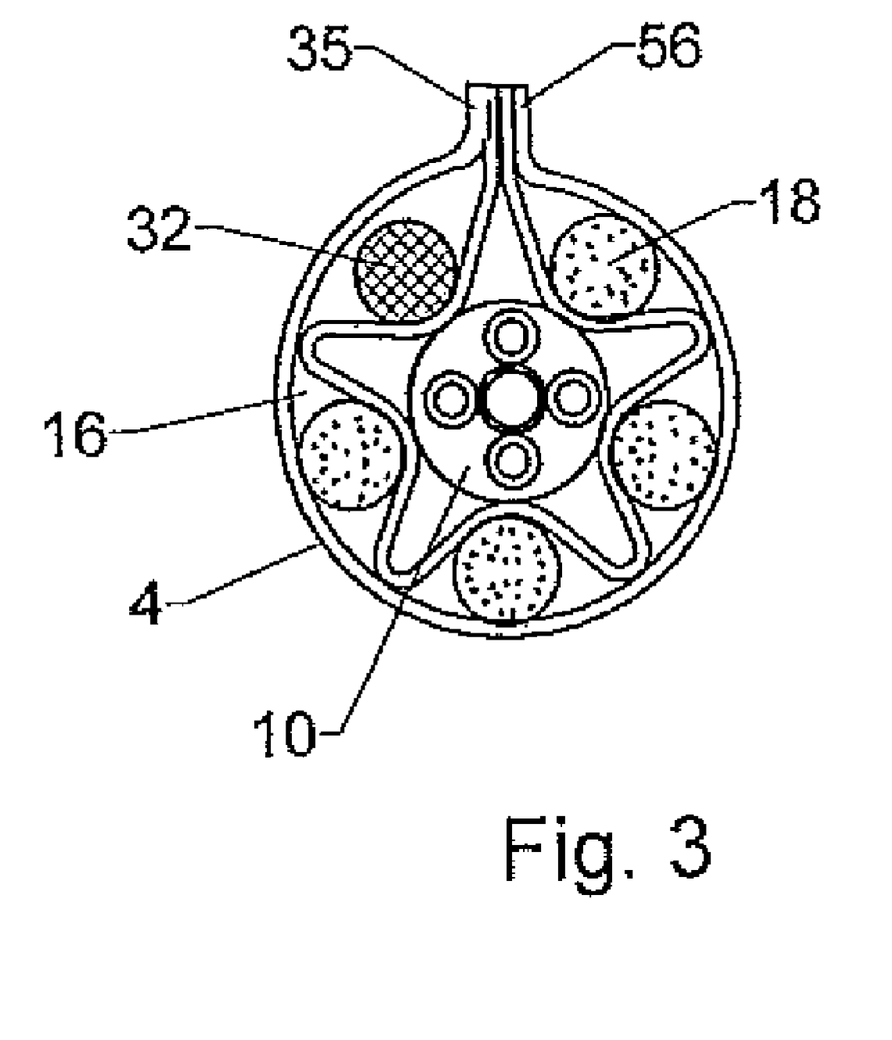
FIG. 3 is a cross sectional view of the cable section from FIG. 1.
Figure 4:
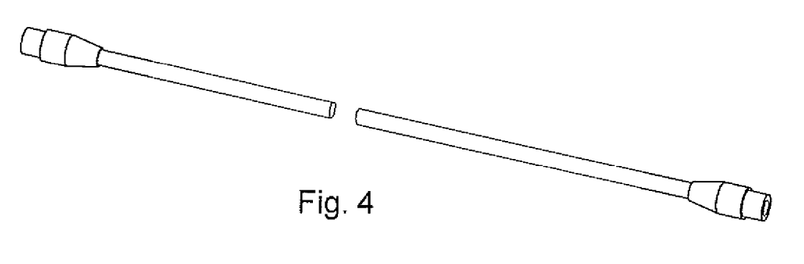
FIG. 4 is a perspective view of a signal-carrying cable

The flexible sheet 14 further comprises a first edge 34 and a second edge 36. These edges are adapted to be sewn or otherwise joined together such that sheet 14 may rolled together about signal-carrying cable 10, or other such signal transferring cable to form a cylinder surrounding the cable, as shown in FIGS. 1 and 3.

Figure 8A:
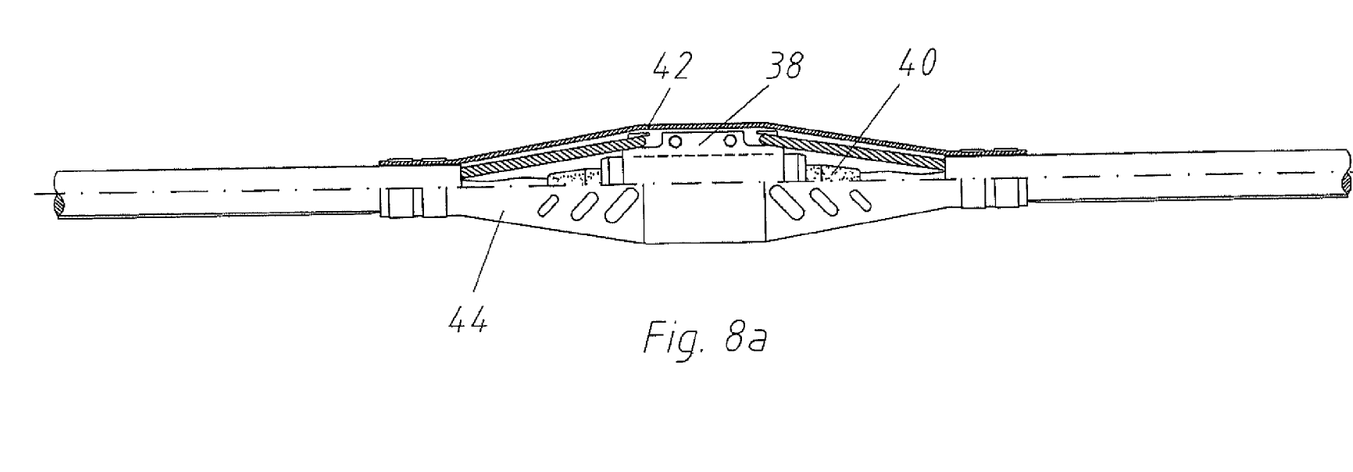
FIGS. 8a and 8b are cross sectional views of a connection arrangement between two cable sections
Figure 8B:
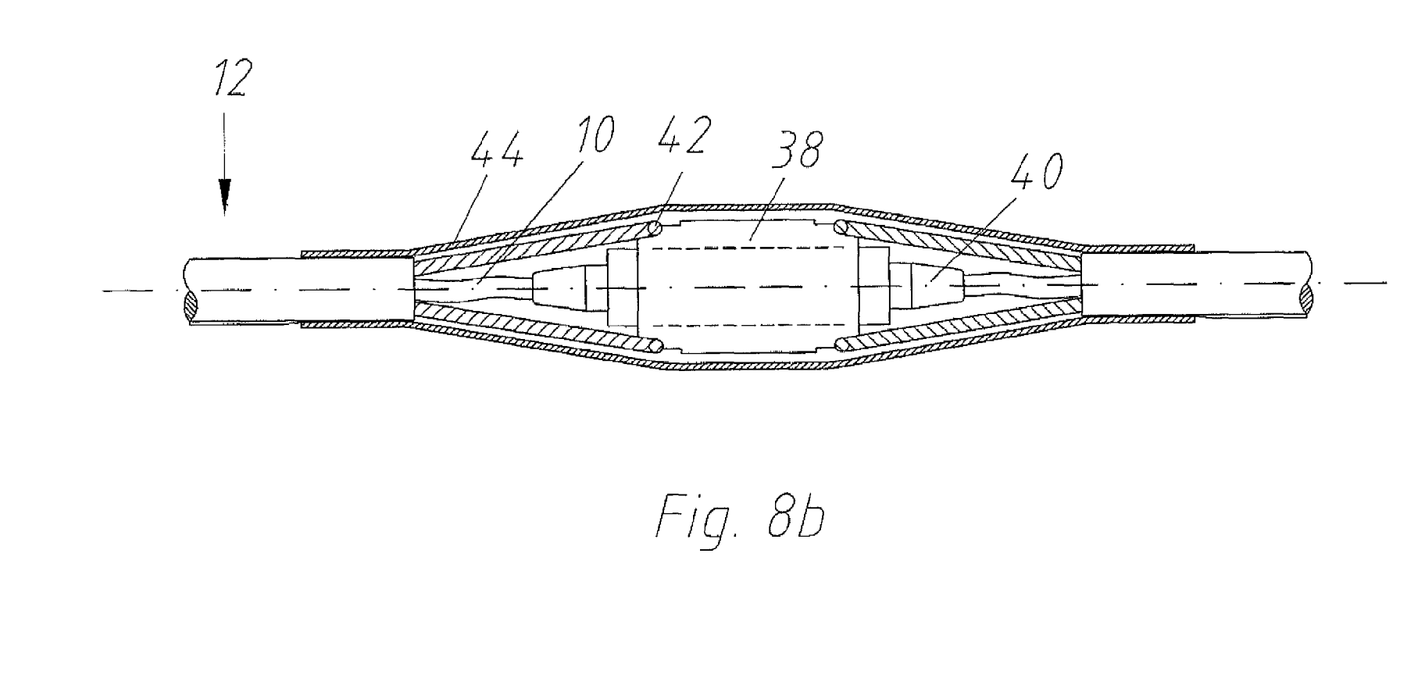
Figure 9:
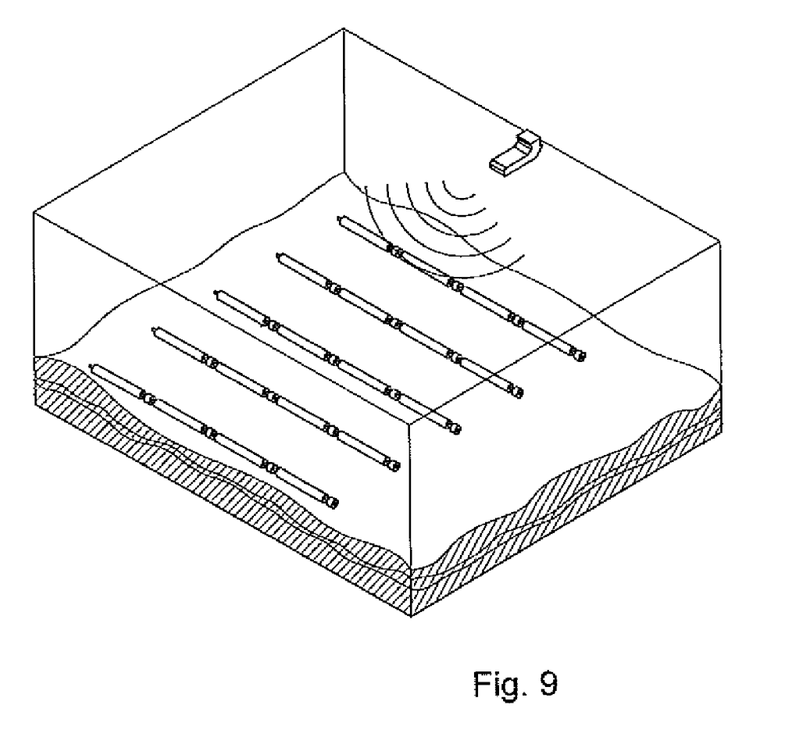
FIG. 9 is a perspective view of a seismic field, representing one possible area of use of the invention

According to one aspect of the invention, two cable sections may be connected to a measurement or signal-processing module 38 as shown in FIGS. 8a and 8b. In this application the signal-carrying cable 10 further comprises a termination member 40 that is connected to module 38. Loops 20 engage a retaining member 42 on the module. A rigid protective covering 44 may be arranged over the connection point as depicted. A plurality of such modules can thereafter be arranged into a seismic field as shown in FIG. 9.

The invention claimed is:

1. A towing sleeve for cables, comprising an elongated sheet of flexible, abrasion-resistant material having a first longitudinal edge and a second longitudinal edge, into which sheet is integrated a plurality of parallel, longitudinal pockets, and one or more flexible, elongated strain elements arranged in the pockets such that the strain element or elements form loops extending past the ends of the elongated sheet, and wherein the first and second longitudinal edges are joined together such that the elongated sheet forms a hollow cylinder, and further wherein the pockets are formed by sandwiching a second layer of flexible, abrasion-resistant material on top of the elongated sheet, said second layer having a greater width than the elongated sheet, and sewing longitudinal seams between the two layers such that longitudinal pockets are formed.

2. A towing sleeve according to claim 1, wherein the strain element is a single rope having its ends joined together by a splice, said rope being doubled back upon itself and arranged in the longitudinal pockets to form two loops extending past the edges of the elongated sheet.

3. A towing sleeve according to claim 1, wherein the strain elements are a plurality of ropes, each of which has its respective ends cojoined by a splice, said ropes being arranged in the longitudinal pockets such that each rope forms a loop extending past each end of the elongated sheet.

4. A towing sleeve according to claim 1, wherein the strain elements are a plurality of ropes having a loop spliced at each end of the rope.

5. A towing sleeve according to claim 1, wherein the first and second longitudinal edges are joined together by sewing.

6. A towing sleeve according to claim 1, wherein an elongated utility element is arranged in one of the pockets.

7. A towing sleeve according to claim 6 wherein the utility element is a waited or buoyant element.

8. A cable comprising a towing sleeve according to claim 1 and a signal-carrying cable arranged in the hollow interior of the cylindrical sleeve.

9. A cable according to claim 8, wherein the signal carrying cable has a termination member attached to at least one end.

10. A seismic cable comprising a plurality of cables sections according to claim 9 arranged in series, wherein the termination member of adjacent cable sections are connected to an intermediate signal gather or processing module, and further wherein the loops extending past the ends of the towing sleeve are attached to retaining members on the module.

11. A seismic cable according to claim 10, further comprising a rigid, hollow covering arranged between adjacent cable sections, inside the interior of which is arranged the module.

12. A seismic field comprising a plurality of seismic cables according to claim 11 arranged in parallel on the seabed.

* * * * *